United States Patent
Fairchild et al.

(10) Patent No.: US 10,232,446 B2
(45) Date of Patent: Mar. 19, 2019

(54) ADAPTIVE DRILLING WITH PIEZO-ELECTRIC FEED OSCILLATOR

(71) Applicant: Apex Brands, Inc., Apex, NC (US)

(72) Inventors: Adam Donald Fairchild, Lexington, SC (US); Rolf Reitz DeSwardt, Blythewood, SC (US); Jeremy Dean Watford, Irmo, SC (US)

(73) Assignee: APEX BRANDS, INC., Apex, NC (US)

(*) Notice: Subject to any disclaimer, the term of this patent is extended or adjusted under 35 U.S.C. 154(b) by 116 days.

(21) Appl. No.: 14/990,135

(22) Filed: Jan. 7, 2016

(65) Prior Publication Data

US 2017/0136552 A1   May 18, 2017

Related U.S. Application Data

(60) Provisional application No. 62/255,754, filed on Nov. 16, 2015.

(51) Int. Cl.
*B23Q 1/34* (2006.01)
*B23B 37/00* (2006.01)
(Continued)

(52) U.S. Cl.
CPC .............. *B23B 37/00* (2013.01); *B23Q 1/34* (2013.01); *B23Q 5/32* (2013.01); *B23Q 5/326* (2013.01);
(Continued)

(58) Field of Classification Search
CPC .......... B23Q 1/34; B23Q 5/326; B23Q 17/20; B23B 2260/108; B23B 31/00; B23B 2270/027
See application file for complete search history.

(56) References Cited

U.S. PATENT DOCUMENTS

| | | |
|---|---|---|
| 1,925,289 A | 9/1933 | Strobel |
| 2,514,759 A | 7/1950 | Hallden |

(Continued)

FOREIGN PATENT DOCUMENTS

| | | |
|---|---|---|
| DE | 4026264 A1 | 2/1992 |
| DE | 202005008630 U1 | 9/2005 |

(Continued)

OTHER PUBLICATIONS

Commander Multi-Drill Chip Breaker, internet article, www.commandermultidrill.com, all enclosed pages cited.

(Continued)

*Primary Examiner* — Daniel Howell
*Assistant Examiner* — Paul M Janeski
(74) *Attorney, Agent, or Firm* — Burr Forman McNair

(57) ABSTRACT

A positive feed tool may include a motor, a power supply operably coupled to the motor to power the motor, a gear head and a spindle. The gear head may be operably coupled to the motor to be operated responsive to powering of the motor. The gear head may include a drive assembly and a feed assembly. The spindle may be operably coupled to the gear head to enable the spindle to be selectively driven rotationally and fed axially based on operation of the drive assembly and the feed assembly, respectively. The feed assembly may include an electronically controlled variable feed rate oscillator.

20 Claims, 6 Drawing Sheets

(51) Int. Cl.
*B23Q 5/32* (2006.01)
*B23Q 17/09* (2006.01)
*B23Q 17/20* (2006.01)

(52) U.S. Cl.
CPC ..... *B23Q 17/0966* (2013.01); *B23Q 17/0995* (2013.01); *B23Q 17/20* (2013.01); *B23B 2260/108* (2013.01); *B23B 2270/027* (2013.01)

(56) References Cited

U.S. PATENT DOCUMENTS

| | | | |
|---|---|---|---|
| 3,363,700 | A | 1/1968 | Bogusch, Jr. |
| 5,073,068 | A | 12/1991 | Jinkins et al. |
| 7,048,077 | B2 | 5/2006 | Veres |
| 7,587,965 | B2 | 9/2009 | Mann et al. |
| 7,882,901 | B2 | 2/2011 | Veres |
| 8,469,641 | B2 | 6/2013 | Jaillon |
| 8,696,265 | B2 | 4/2014 | Elsmark et al. |
| 8,721,232 | B2 | 5/2014 | Peigne |
| 8,926,235 | B2 * | 1/2015 | Moraru ............... B23B 29/125 310/323.19 |
| 2006/0251480 | A1 | 11/2006 | Mann et al. |
| 2007/0209813 | A1 | 9/2007 | Veres |
| 2009/0074525 | A1 | 3/2009 | Jaillon |
| 2010/0003096 | A1 | 1/2010 | Peigne |
| 2013/0051946 | A1 | 2/2013 | Peigne |
| 2014/0238711 | A1 | 8/2014 | Myhill |
| 2016/0129505 | A1 * | 5/2016 | Masciantonio ........ B23Q 5/402 408/17 |

FOREIGN PATENT DOCUMENTS

| | | |
|---|---|---|
| DE | 102005002462 A1 | 7/2006 |
| EP | 1500780 A1 | 1/2005 |
| EP | 1916045 A1 | 4/2008 |
| EP | 2032294 B1 | 9/2010 |
| EP | 2501518 B1 | 10/2013 |
| FR | 2944722 A1 | 10/2010 |
| FR | 2952563 A1 | 5/2011 |
| GB | 1212475 A | 11/1970 |
| JP | H03136710 A | 6/1991 |
| WO | 2008000935 A1 | 1/2008 |
| WO | 2013088343 A1 | 6/2013 |
| WO | 2014064047 A1 | 5/2014 |
| WO | 2016062964 A1 | 4/2016 |
| WO | 2016162483 A2 | 10/2016 |

OTHER PUBLICATIONS

International Search Report and Written Opinion of corresponding PCT application PCT/US2016/062016 dated Feb. 22, 2017, all enclosed pages cited.

* cited by examiner

ADAPTIVE DRILLING WITH PIEZO-ELECTRIC FEED OSCILLATOR

CROSS REFERENCE TO RELATED APPLICATIONS

The present application claims priority to U.S. patent application No. 62/255,754 filed Nov. 16, 2015, which is expressly incorporated by reference in its entirety.

TECHNICAL FIELD

Example embodiments generally relate to power tools and, in particular, relate to positive feed tools that employ feed rate oscillation.

BACKGROUND

Power tools are commonly used across all aspects of industry and in the homes of consumers. Power tools are employed for multiple applications including, for example, drilling, tightening, sanding, and/or the like. For some drilling and fastening operations, positive feed tools may be preferred. Positive feed tools are often used to perform operations on workpieces such as steel, aluminum, titanium and composites, and may employ a tool feeding mechanism that feeds a bit into the workpiece at a controlled rate. Such tools are common in the aviation industry, and other industries in which precise drilling is needed in metallic workpieces or other hard workpieces.

Drilling holes, and particularly drilling deep holes within workpieces that are hard, using conventional methods can typically produce long drilled chips that are difficult to evacuate from the hole. These long chips are generated because the bit is fed into the workpiece at a constant feed rate (e.g., 0.003 inches per revolution). The constant feed rate means that the chips will have a constant thickness (i.e., 0.003 inches) that leads to a spiral shaped chip forming and growing as the drilling operation proceeds. The chips may end up being multiple hole diameters long, and can cause chip packing. The chips can therefore cause additional torque to be required, and can lead to longer cycle times and poor hole quality.

To address this issue, variation or oscillation of the feed rate may be introduced. By varying the feed rate (e.g., changing the feed rate by 0.001 to 0.005 inches per revolution), the resulting chips will have a variable thickness that alternates between thin and thick sections. This variable thickness will cause the chips to tend to break at the thin sections, and enable the remainder of the chip to be evacuated more easily. This method may be referred to as micro-peck drilling because the cutter (e.g., the bit) stays in the material and is always cutting a chip. If the amplitude is increased to exceed the feed rate, then macro-peck drilling results in which the cutter is actually removed from contact with the material of the workpiece.

Micro-peck drilling methods that are currently employed typically use special thrust bearings that have oscillating cam profiles. However, these special thrust bearings are typically very expensive and have limited life spans.

BRIEF SUMMARY OF SOME EXAMPLES

Some example embodiments may enable the provision of a positive feed tool that employs a different structure to employ micro-peck drilling with an oscillating feed rate. In this regard, some example embodiments may provide a piezo electric feed rate oscillator.

In an example embodiment, a positive feed tool is provided. The tool may include a motor, a power supply operably coupled to the motor to power the motor, a gear head and a spindle. The gear head may be operably coupled to the motor to be operated responsive to powering of the motor. The gear head may include a drive assembly and a feed assembly. The spindle may be operably coupled to the gear head to enable the spindle to be selectively driven rotationally and fed axially based on operation of the drive assembly and the feed assembly, respectively. The feed assembly may include an electronically controlled variable feed rate oscillator.

In another example embodiment, a gear head for selectively driving and feeding a spindle of a positive feed tool is provided. The gear head may include a drive assembly configured to selectively drive the spindle rotationally, and a feed assembly configured to selectively feed the spindle axially. The feed assembly may include an electronically controlled variable feed rate oscillator.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
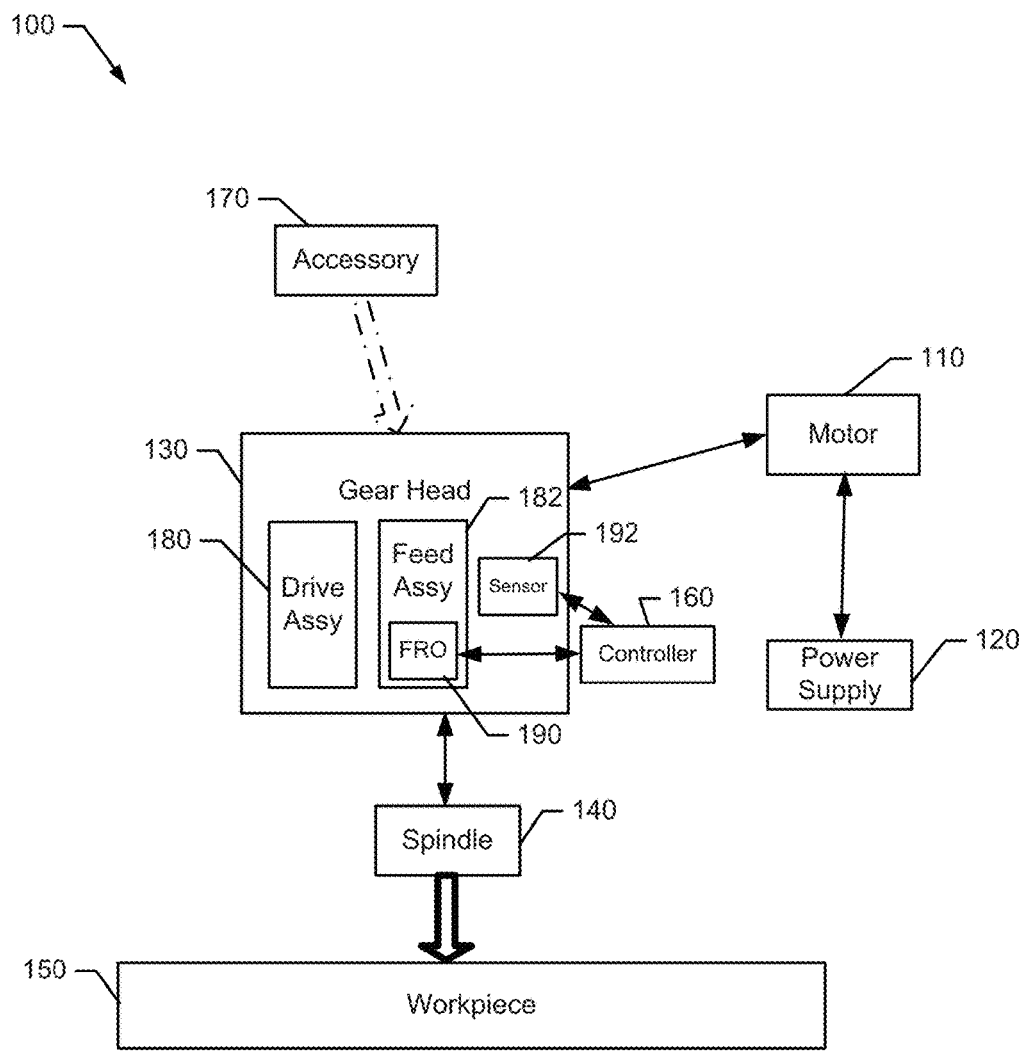
FIG. 1 illustrates a functional block diagram of a positive feed tool that may employ a feed rate oscillator according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of highly capable positive feed tools that also have superior characteristics relative to providing feed rate oscillation. In particular, some example embodiments may provide a positive feed tool having a feed rate oscillator that provides a variable range of feed rate oscillation so that chip formation can be controlled by the user based on the amplitude of feed rate oscillation provided. As such, some example embodiments may provide a variable feed rate oscillator that is electronically controlled. The variable feed rate oscillator may be embodied, in some examples, as a piezo electric ring stack. FIG. 1 illustrates a functional block diagram of a positive feed tool that may employ a variable feed rate oscillator according to an example embodiment.

As shown in FIG. 1, a positive feed tool 100 of an example embodiment may include a motor 110, a power supply 120 and a gear head 130 that is configured to drive a spindle 140. The spindle 140 may be driven to rotate about an axis and also be fed in a direction along the axis of rotation to, for example, power a bit disposed at a distal end of the spindle 140 to drill a hole in a workpiece 150. In some cases, the motor 110 or other components of the positive feed tool 100 may be operated under the control of a controller 160. Although not required, the gear head 130 may be fitted or mated with one or more accessories 170 that may augment or otherwise alter various capabilities or aspects of performance of the positive feed tool 100. The accessories 170 may therefore be removable, exchangeable, or otherwise electively employed for operation of the positive feed tool 100.

In some examples, the motor 110 may be a pneumatic motor, and the power supply 120 may therefore be pressurized air. However, in alternative embodiments, the motor 110 may be an electric motor or a hydraulically powered motor, and the power supply 120 would then be battery/mains power or a hydraulic power supply, respectively. Regardless of how the motor 110 is powered, the motor 110 may be operably coupled to the gear head 130 to drive and feed the spindle 140.

In an example embodiment, the motor 110 may be operably coupled to drive the gear head 130 for rotation of the spindle 140 about an axis thereof via a drive assembly 180. In some cases, the spindle 140 may be an elongated member having one or more slots for engagement with a drive gear of the drive assembly 180 to rotate the spindle 140 based on rotation of the drive gear. The spindle 140 may also include threads for engagement with a feed gear of a feed assembly 182 that is configured to feed the spindle 140 in a direction along the axis of the spindle 140 and into (or away from) the workpiece 150. Thus, for example, the drive assembly 180 and the feed assembly 182 may be operably coupled to the motor 110 (and/or each other) to enable selective drive and feeding of the spindle 140.

As mentioned above, if the feed assembly 182 is powered to generate a constant feed rate (e.g., 0.003 inches per revolution), then the spiral shaped chips having a constant thickness will be generated, and various problems could result. Accordingly, to vary the thickness of the chips, and to facilitate breakage and more easy evacuation of the chips, an oscillating feed rate may be employed. To provide the oscillating feed rate, example embodiments may employ a feed rate oscillator 190 (or FRO), which may be operably coupled to or provided as a portion of the feed assembly 182.

In some example embodiments, the feed rate oscillator 190 may be a variable feed rate oscillator that is electronically controlled (e.g., via the controller 160). In such an example, the controller 160 may automatically (or responsive to user commands) control the amplitude of feed rate oscillation to define a desirable or optimal amount of feed rate oscillation. In some cases, the controller 160 may be operably coupled to a sensor 192, and the sensor 192 may provide information to the controller 160 to enable the controller 160 to determine a desirable or optimal amplitude of feed rate oscillation to employ for a given material or for currently measured parameters associated with operation of the positive feed tool 100.

Figure 2:
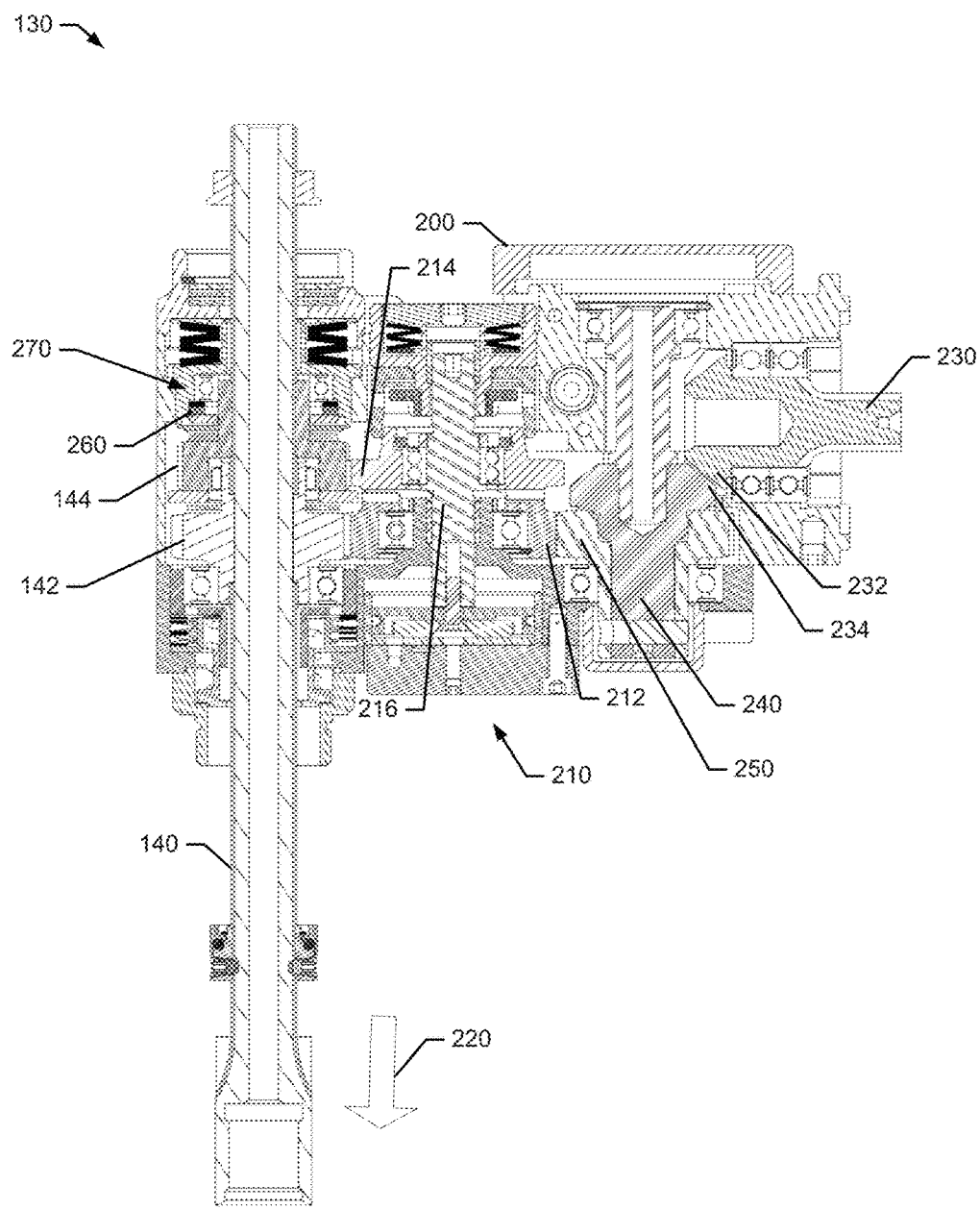
FIG. 2 illustrates a cross section view of a positive feed tool having a feed rate oscillator according to an example embodiment.

As may be appreciated from the description above, the specific components of the gear head 130 can be varied in some cases. An example structure for the gear head 130 will be described in reference to FIG. 2. However, other specific structures can be employed to embody portions of the gear head 130 in some alternative embodiments. The structure employed for certain portions of the gear head 130 may then impact corresponding structures employed for the feed rate oscillator 190. The example of FIG. 2 provides an internally mounted configuration for the variable feed rate oscillator. However, external mounting is also possible (see FIG. 3).

Referring now to FIG. 2, the gear head 130 may include a casing or housing 200 inside which various components of the drive assembly 180 and the feed assembly 182 may be housed. The motor 110 may be operably coupled to the spindle 140 via a differential unit 210. The differential unit 210 may include a differential drive gear 212 and a differential feed gear 214 that may engage a spindle drive gear 142 and spindle feed gear 144, respectively. The spindle drive gear 142 and spindle feed gear 144 may each be operably coupled to the spindle 140 to selectively provide drive and feed for the spindle 140. Meanwhile, the differential drive gear 212 and the differential feed gear 214 may each be operably coupled to a feed shaft 216.

In an example embodiment, the spindle 140 may include one or more slots for engagement with the spindle drive gear 142 and threads for engagement with the spindle feed gear 144. The spindle drive gear 142 and spindle feed gear 144 may each also have a generally annular shape with a central opening to receive the spindle 140. Internal threads provided on the spindle feed gear 144 may engage external threads along the length of the spindle 140 so that when the spindle feed gear 144 is rotated in relation to the spindle 140, the spindle 140 will feed in an advancing feed direction shown by arrow 220.

The differential drive gear 212 and the differential feed gear 214 each extend around the feed shaft 216 and include gear teeth for engagement with respective ones of the spindle drive gear 142 and spindle feed gear 144. The differential feed gear 214 is operably coupled to the feed shaft 216 to move axially with the feed shaft 216. The differential drive gear 212 is operably coupled to the feed shaft 216, but does not move axially with the feed shaft 216, instead having a central opening through which the feed shaft 216 slides.

When the motor 110 operates, an input shaft 230 is turned. A set of bevel gears 232/234 then translates the rotation of the input shaft 230 to input gear 240. Another gear 250 is operably coupled to the input gear 240. The input gear 240 is operably coupled to the differential unit 210 (e.g., via the differential drive gear 212. The differential drive gear 212 and the differential feed gear 214 may be selectively operably coupled to each other to cause the differential feed gear 214 to either rotate with the differential drive gear 212 (e.g., when the differential drive gear 212 and the differential feed gear 214 are engaged) or not rotate with the differential drive gear 212 (e.g., when the differential drive gear 212 and the differential feed gear 214 are not engaged). The spindle drive gear 142 will generally be driven by the differential drive gear 212 when the motor 110 operates and rotate the spindle 140. However, the spindle feed gear 144 is only driven when the differential feed gear 214 is engaged with the differential drive gear 212. When the differential feed gear 214 is disengaged from the differential drive gear 212, both the differential feed gear 214 and the spindle feed gear 144 become stationary. The rotation of the spindle 140 while the spindle feed gear 144 is stationary then resultantly causes the spindle 140 to be withdrawn and move in a direction opposite the advancing feed direction shown by arrow 220.

In a typical configuration, the feed rate generated by the operation described above would be a constant feed rate (e.g., of about 0.003 inches per revolution). Similarly, in some typical configurations, the load created by the resistance to feeding of the spindle 140 into the workpiece 160 may generally be borne by a thrust bearing 260 provided, for example, between some portion or component operably coupled to the housing 200 and the spindle feed gear 144. Thus, for example, one way to convert to a micro-peck drilling method may be accomplished by changing the shape and function of the thrust bearing 260 so that an oscillating feed rate is achieved. However, employing such a method for achieving micro-peck drilling would result in a fixed amount of oscillation.

To enable a variable amount of feed rate oscillation to be achievable, some example embodiments may employ a piezo feed rate oscillator 270 as an example embodiment of the feed rate oscillator 190 of FIG. 1. The piezo feed rate oscillator 270 may be embodied as a piezo ring stack disposed proximate to the thrust bearing 260 (on either side). The piezo feed rate oscillator 270 may have electrical connections provided thereto, so that a voltage can selectively be applied to the piezo feed rate oscillator 270 (e.g., under control of the controller 160). Based on the properties of piezo electric crystals, the application of voltage thereto may cause the physical properties of the piezo feed rate oscillator 270 to change. In particular, the thickness of the piezo feed rate oscillator 270 may be smaller when no voltage is applied, and may increase when the voltage is applied. Accordingly, by altering the voltage, the piezo feed rate oscillator 270 may correspondingly change its thickness based on the voltage applied. The stack length, and therefore also the chip thickness generated, will correspondingly also change.

Thus, for example, if a steady state feed rate of 0.003 inches per revolution was employed when a steady state voltage is applied, by raising and lowering the voltage applied to the piezo feed rate oscillator 270, the feed rate could be oscillated between, for example, 0.001 inches per revolution to 0.005 inches per revolution. However, it should also be appreciated that the magnitude of voltage change may correspondingly change the amplitude of the oscillation. Thus, the piezo feed rate oscillator 270 may be capable of providing control over the change in chip thickness. Similarly, by controlling the amount of time (or frequency) the voltage is applied to the piezo feed rate oscillator 270, the length of the chip can be varied. In an example embodiment, the frequency could be varied by applying a sinusoidal waveform or a custom developed waveform to achieve the desired chip size.

Figure 3:
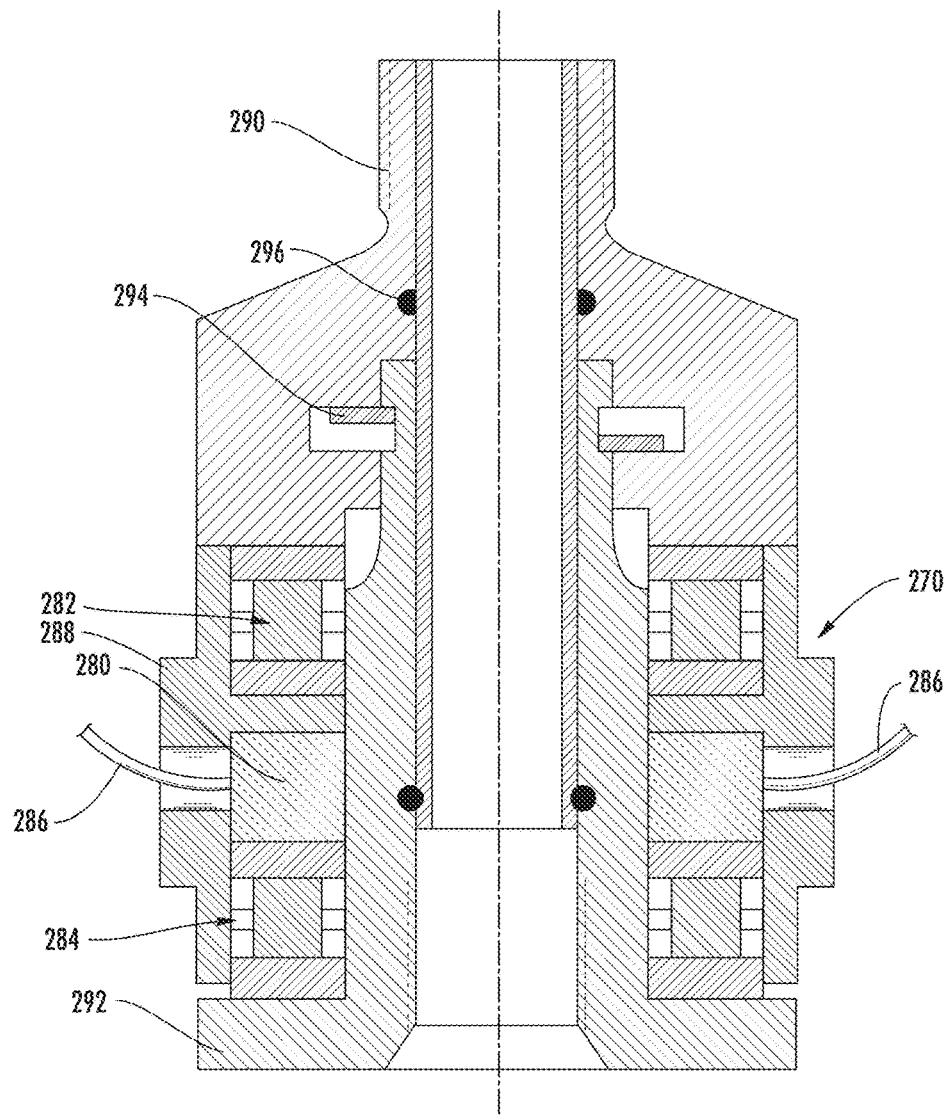
FIG. 3 illustrates the cross section view of piezo electric ring stack in accordance with an example embodiment.

FIG. 3 illustrates a cross section view of the area in which the piezo feed rate oscillator 270 may be located for external mounting according to an example embodiment. As shown in FIG. 3, the piezo feed rate oscillator 270 may include a piezo electric ring stack 280 provided between a first thrust bearing set 282 (including two thrust washers and a thrust bearing) and a second thrust bearing set 284. Electrical wiring 286 (or optional induction coils for wireless connection) may be provided to enable the piezo electric ring stack 280 to be energized, and the electrical wiring 286 may pass through a stationary housing 288. The piezo feed rate oscillator 270 may be provided between an upper housing portion 290 and a lower housing portion 292. In an example embodiment, a wave retaining ring 294 is provided to hold the lower housing portion 292 to the upper housing portion 290 and to provide a spring-like function to allow the piezo electric ring stack 280 to oscillate. Some embodiments may also optionally include through spindle coolant with seals 296.

Figure 4:
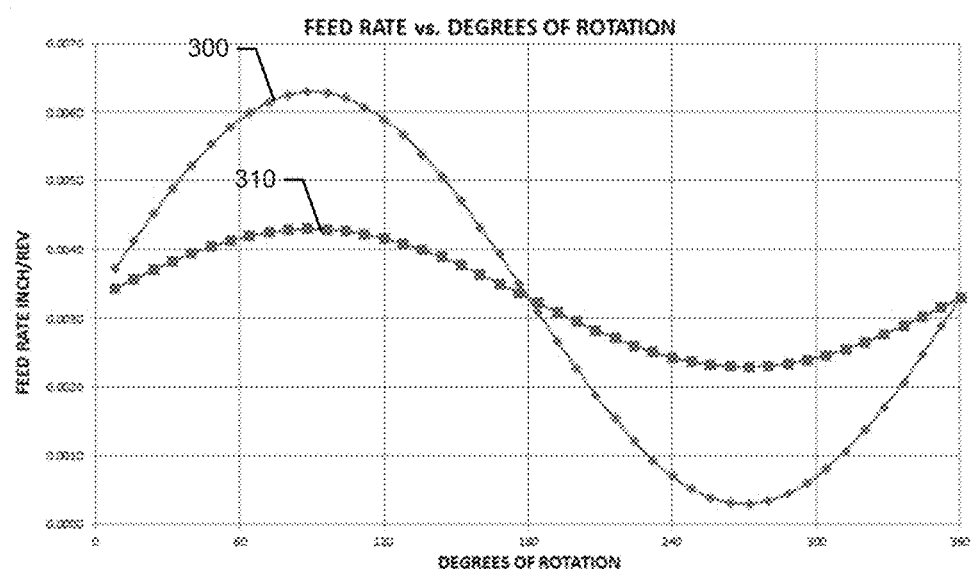
FIG. 4 illustrates a first amplitude curve and a second amplitude curve shown on the same axis in accordance with an example embodiment.
Figure 5A:
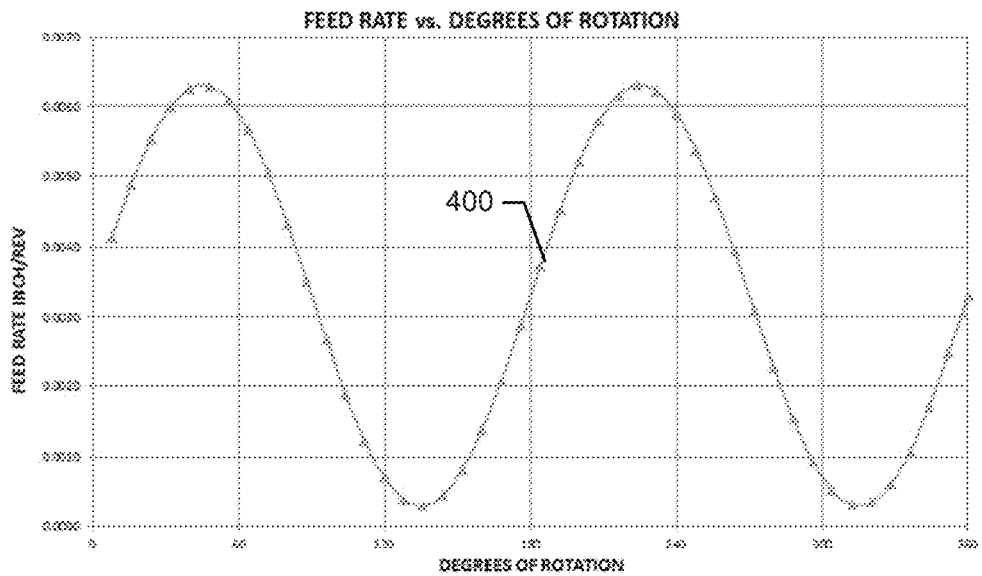
FIG. 5A illustrates a change in feed rate versus degrees of rotation in accordance with an example embodiment.
Figure 5B:
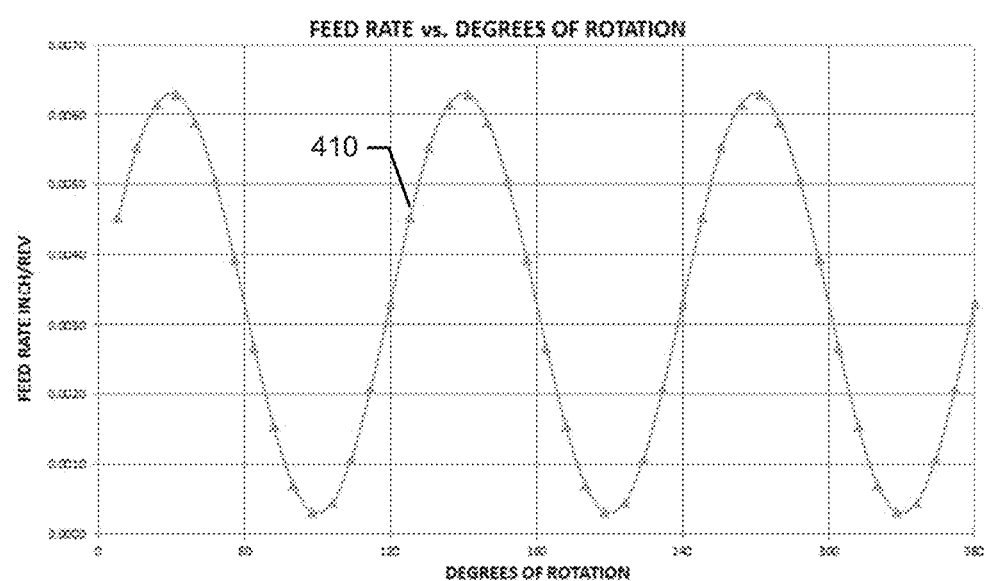
FIG. 5B illustrates a change in feed rate versus degrees of rotation in accordance with an alternative example embodiment.

FIG. 4 illustrates a first amplitude curve 300 and a second amplitude curve 310 shown on the same axis in accordance with an example embodiment. The first amplitude curve 300 corresponds to a larger change in voltage at a given frequency (or number of cycles of feed rate change per revolution). The second amplitude curve 310 corresponds to a smaller change in voltage for the given frequency (or number of cycles of feed rate change per revolution). However, frequency changes may also be provided, as shown in FIGS. 5A and 5B. In FIG. 5A, a first frequency curve 400 is shown at a given amplitude and a given frequency (i.e., two cyclic changes to the feed rate per revolution). By increasing the frequency applied to the piezo feed rate oscillator 270 (but not changing the magnitude of the change in voltage), a second frequency curve 410 (i.e., three cyclic changes to the feed rate per revolution) may be generated, as shown in FIG. 5B, at the given amplitude but with a higher frequency than the given frequency shown in FIG. 5A.

As can be appreciated from the description above, the piezo feed rate oscillator 270 can give a near infinite number of options for changing the feed rate, and the options can be selected simply by changing the amplitude and frequency of the voltage applied to the piezo feed rate oscillator 270. In some cases, the operator may interact with the controller 160 to manually set amplitude and/or frequency to get the desired chip size for a given drilling operation. However, different materials may have different optimal chip sizes. Thus, it may be desirable to have the controller 160 automatically select a programmed chip size based on knowledge of the material being drilled.

In some cases, the controller 160 (which may include a processor and memory (e.g., processing circuitry)) may be configured to provide selectable settings that correspond to different drill profiles for different materials or layers of materials in laminated composite materials. Thus, for example, the controller 160 may store information indicative the identity of a composite material along with corresponding information descriptive of the makeup and parameters associated with the layers that form the composite material. In some cases, the controller 160 may therefore have information descriptive of the depth and type of certain materials within the composite material. Based on drilling depth, the controller 160 may therefore determine which material is likely encountered by the bit at the drilling depth. The controller 160 may then access (e.g., via a lookup table) the desired chip size to be generated for the material of the layer encountered at the current depth. The controller 160 may then select an amplitude and/or frequency profile for the voltage that is to be provided to the piezo feed rate oscillator 270 based on the desired chip size. The amplitude and/or frequency of the voltage provided to the piezo feed rate oscillator 270 may then be adjusted based on depth, material and/or the like.

Figure 6:
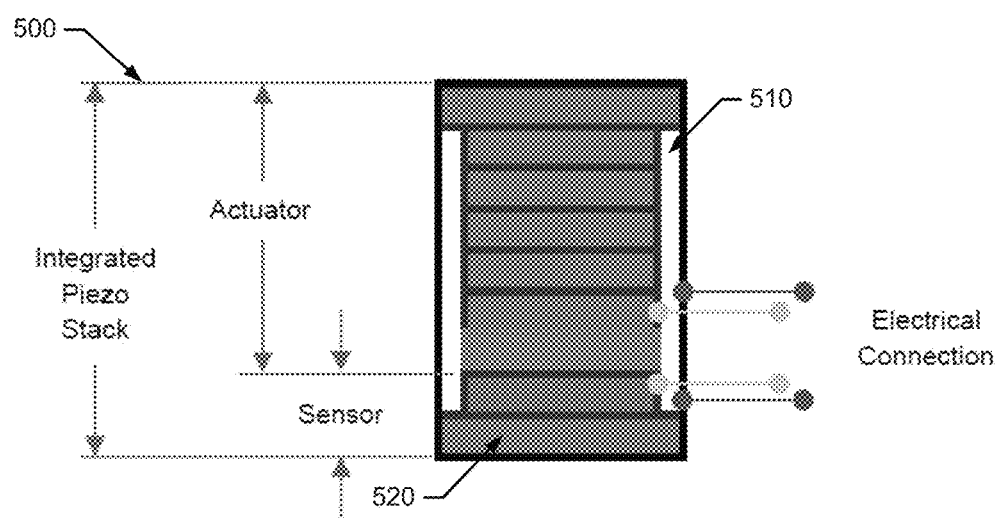
FIG. 6 illustrates an example plan view of an integrated piezo stack in which one portion of the integrated piezo stack acts as an actuator and another portion acts as a sensor in accordance with an example embodiment.

In an example embodiment, two piezo electric ring stacks could be employed and configured such that one acts as a sensor and the other acts as the piezo feed rate oscillator 270. In such an example, the piezo electric ring stack that acts as a sensor (e.g., sensor 192 of FIG. 1) may be compressed based on the excitation provided to the piezo feed rate oscillator 270 and the sensor may provide a voltage output that is proportional to the amount of compression, and the amount of thrust load measured. This voltage output may be useful in enabling the controller 160 to determine when a new layer of material has been encountered (e.g., based on a change in the voltage output) and, in some cases, may further enable the controller 160 to determine the type of material being encountered and a corresponding desired chip thickness or profile to employ for the determined type of material. Thus, for example, the sensor can enable the controller 160 to determine (e.g., in real time) the amount of change of thickness of the chip that is desired to presently be generated. The controller 160 may interface with the sensor to enable further responsiveness and control in association with the feed rate oscillation that is generated by the piezo feed rate oscillator 270. FIG. 6 illustrates an example plan view of an integrated piezo stack 500 in which one portion of the integrated piezo stack 500 acts as an actuator 510 and another portion acts as a sensor 520 (e.g., as an example of the sensor 192).

By providing the ability to control the size of the chips generated during the drilling process, the controller 160 further enables the speed of drilling to be optimized for the material being drilled. In this regard, since chip evacuation will be more easily accomplished, the speed of drilling may sometimes be increased. Additionally or alternatively, the amplitude or frequency range of the variable feed rate oscillator may be adjustable (i.e., via the controller 160) to a plurality of non-discrete values between respective maximum and minimum values. In other words, based on electronic control, the positive feed tool 100 may provide an infinite frequency range and travel range between minimum and maximum ranges of the piezo feed rate oscillator 270.

In some example embodiments, the sensor and/or the piezo feed rate oscillator 270 may be accessories (e.g., examples of accessory 170 of FIG. 1), and may be removable, replaceable, or otherwise insertable by the operator. However, in other examples, the piezo feed rate oscillator 270 may be factory installed, and may be a permanent component of the positive feed tool 100. Regardless of whether the piezo feed rate oscillator 270 is fixed or removable relative to the positive feed tool 100, the piezo feed rate oscillator 270 provides infinite frequency range and travel range between a minimum and maximum ranges of piezo electric ring stacks. The piezo feed rate oscillator 270 therefore provides for vibration assisted drill functionality that can be selectively engaged and disengaged electronically. Frequency and travel can be controlled independently for advancing and retracting cycles. In some cases, thrust loads can be measured in real time by providing a second independent layer in the stack. Providing such real time data may allow the controller to detect changes in material for laminated material stacks. The controller may therefore change drill parameters to match the current material layer being drilled. Tool life may also be monitored based on measurement of the thrust load since increased load may be an indicator of tool (or bit) wear. Material break through may also be detected to shutdown coolant and/or adjust cutting parameters. In some cases, the additional information and control provided may allow higher drilling speeds and thrust loads to be employed without reducing the service life of components. The positive feed tool 100 may essentially be employed as a hammer drill or as a vibration assisted drill based on the design of the piezo electric ring stack. Moreover, the piezo feed rate oscillator 270 could be internally or externally mounted to the positive feed tool 100.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A positive feed tool comprising:
   a motor;
   a power supply operably coupled to the motor to power the motor;
   a gear head operably coupled to the motor to be operated responsive to powering of the motor, the gear head comprising a drive assembly and a feed assembly;
   a spindle operably coupled to the gear head to enable the spindle to be selectively driven rotationally and fed axially based on operation of the drive assembly and the feed assembly, respectively; and
   a variable feed rate oscillator configured to cause oscillation of the spindle via operable coupling with the feed assembly based on a frequency and an amplitude of a voltage applied to the variable feed rate oscillator;
   wherein the variable feed rate oscillator comprises a piezo electric ring stack that is operably coupled to the feed assembly via a first thrust bearing and is disposed between the first thrust bearing and a second thrust bearing of the gear head;
   wherein the piezo electric ring stack is configured to receive the voltage applied to the variable feed rate oscillator via electrical connections to the piezo electric ring stack;

wherein, altering the amplitude of the voltage changes a thickness of the piezo electric ring stack and altering a frequency of the voltage changes a rate of change of the thickness of the piezo electric stack.

2. The positive feed tool of claim 1, wherein the piezo electric ring stack is disposed around the spindle such that the spindle passes through an opening in the piezo electric ring stack and the piezo electric ring stack is disposed within the gear head between the first thrust bearing and the second thrust bearing.

3. The positive feed tool of claim 1, further comprising a controller configured to control the amplitude and the frequency of the voltage applied to the piezo feed rate oscillator;
wherein the piezo electric ring stack comprises induction coils, and wherein the electrical connections to the piezo electric ring stack are wireless connections via the inductions coils of the piezo electric ring stack.

4. The positive feed tool of claim 1, further comprising a controller configured to enable the amplitude and the frequency of the voltage applied to the piezo feed rate oscillator to be controlled automatically.

5. The positive feed tool of claim 4, wherein the controller interfaces with a second piezo electric ring stack configured as a sensor, the second piezo electric ring stack providing a real time indication of thrust load generated by the positive feed tool.

6. The positive feed tool of claim 5, wherein the controller adjusts the amplitude or frequency based on the thrust load.

7. The positive feed tool of claim 1, wherein the motor is a pneumatically driven motor.

8. The positive feed tool of claim 7, wherein the power supply comprises pressurized air.

9. The positive feed tool of claim 1, further comprising a controller configured to control the variable feed rate oscillator, wherein the controller is further configured to detect events including changes in a material being acted upon by the positive feed tool and tool break through and control operation of the gear head responsive to detection of one of the events.

10. The positive feed tool of claim 9, wherein the controller is further configured to monitor tool life based on monitoring thrust load.

11. The positive feed tool of claim 1, further comprising a controller configured to control the variable feed rate oscillator, wherein the controller is further configured to adjust the amplitude and the frequency based on a drilling depth and information in a look up table indicating a desired chip size for a material at the drilling depth.

12. A gear head for selectively driving and feeding a spindle of a positive feed tool, the gear head comprising:
a drive assembly configured to selectively drive the spindle rotationally;
a feed assembly configured to selectively feed the spindle axially; and
a variable feed rate oscillator configured to cause oscillation of the feed assembly based on a frequency and an amplitude of a voltage applied to the variable feed rate oscillator;
wherein the variable feed rate oscillator comprises a piezo electric ring stack that is operably coupled to the feed assembly via a first thrust bearing and is disposed between the first thrust bearing and a second thrust bearing of the gear head;
wherein the piezo electric ring stack is configured to receive the voltage applied to the variable feed rate oscillator via electrical connections to the piezo electric ring stack;
wherein, altering the amplitude of the voltage changes a thickness of the piezo electric ring stack and altering a frequency of the voltage changes a rate of change of the thickness of the piezo electric stack.

13. The gear head of claim 12, wherein the piezo electric ring stack is disposed around the spindle such that the spindle passes through an opening in the piezo electric ring stack and the piezo electric ring stack is disposed within the gear head between the first thrust bearing and the second thrust bearing.

14. The gear head of claim 12, wherein the feed assembly is configured to interface with a controller, the controller being configured to control the amplitude and the frequency of the voltage applied to the piezo feed rate oscillator;
wherein the piezo electric ring stack comprises induction coils, and wherein the electrical connections to the piezo electric ring stack are wireless connections via the inductions coils of the piezo electric ring stack.

15. The gear head of claim 12, wherein the feed assembly is configured to interface with a controller, the controller being configured to control the amplitude or the frequency of the voltage applied to the piezo feed rate oscillator to be controlled automatically.

16. The gear head of claim 15, wherein the controller interfaces with a second piezo electric ring stack configured as a sensor, the second piezo electric ring stack providing a real time indication of thrust load generated by the positive feed tool.

17. The gear head of claim 16, wherein the controller adjusts the amplitude or frequency based on the thrust load.

18. The gear head of claim 12, wherein the feed assembly is configured to interface with a controller, the controller being configured to control the variable feed rate oscillator, wherein the controller is further configured to detect events including changes in a material being acted upon by the gear head and tool break through and control operation of the gear head responsive to detection of one of the events.

19. The gear head of claim 18, wherein the controller is further configured to monitor tool life based on monitoring thrust load.

20. The gear head of claim 12, wherein the feed assembly is configured to interface with the controller, wherein the controller is configured to control the variable feed rate oscillator, and wherein the controller is further configured to adjust the amplitude and the frequency range of the variable feed rate oscillator to a plurality of non-discrete values between respective maximum and minimum values.

* * * * *